United States Patent [19]

Huey

[11] Patent Number: 4,846,864

[45] Date of Patent: Jul. 11, 1989

[54] METHOD AND APPARATUS FOR PRODUCING HOLLOW GLASS FILAMENTS

[75] Inventor: Larry J. Huey, Granville, Ohio

[73] Assignee: Owens-Corning Fiberglas Corporation, Toledo, Ohio

[21] Appl. No.: 195,566

[22] Filed: May 18, 1988

[51] Int. Cl.⁴ .......................................... C03B 37/075
[52] U.S. Cl. ................................................ 65/1; 65/2; 65/86; 425/133.1; 425/462; 425/DIG. 217
[58] Field of Search ..................... 65/1, 2, 5, 86, 121; 425/133.1, 462, DIG. 217

[56] References Cited

U.S. PATENT DOCUMENTS

| | | | |
|---|---|---|---|
| 3,197,812 | 8/1965 | Dietzsch et al. | 65/24 |
| 3,268,313 | 8/1966 | Burgman et al. | 65/5 |
| 4,698,082 | 10/1987 | Jensen | 65/1 |
| 4,704,149 | 11/1987 | Palamara et al. | 65/1 |
| 4,735,642 | 4/1988 | Jensen et al. | 65/1 |
| 4,758,259 | 7/1988 | Jensen | 65/1 |

Primary Examiner—Robert L. Lindsay
Attorney, Agent, or Firm—Patrick P. Pacella; Robert F. Rywalski

[57] ABSTRACT

A feeder for the production of hollow glass filaments is comprised of tip assemblies wherein a tube positioned in the stream defining member is in communication with the gas in the fiber forming region immediately below the dischrge wall to form a gas filled void in the stream and filament.

23 Claims, 4 Drawing Sheets

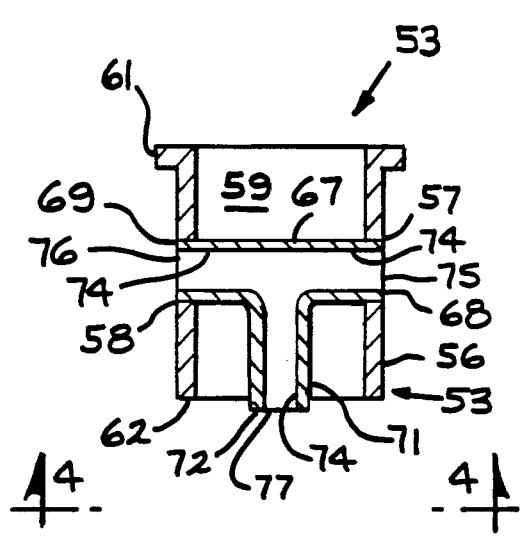
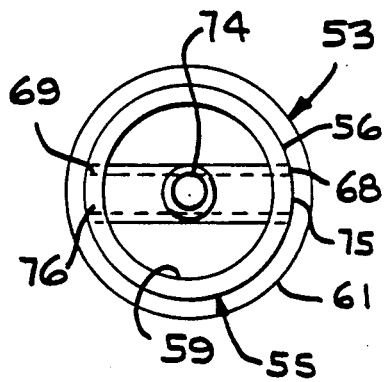
FIG.3
FIG.4
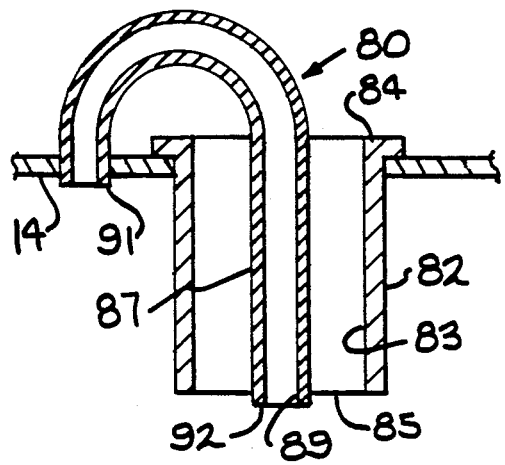
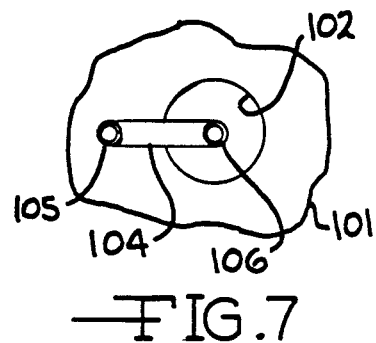
FIG.5
FIG.7
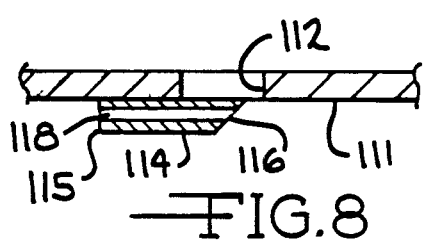
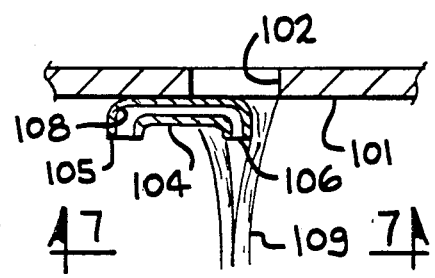
FIG.8
FIG.6

_4,846,864_

METHOD AND APPARATUS FOR PRODUCING HOLLOW GLASS FILAMENTS

TECHNICAL FIELD

The invention disclosed herein relates to the construction and operation of glass filament forming feeders.

BACKGROUND

Glass filaments usually have a solid cross-section. There are, however, instances where hollow filaments would be preferred, since substantially the same rigidity can be achieved with reduced weight by employing hollow filaments.

U.S. Pat. No. 2,269,459 discloses flame drawing a preformed glass tube into a hollow filament. U.S. Pat. Nos. 4,698,082 and 4,704,149 disclose systems for forming hollow filaments wherein a gas supply tube is positioned in each tip of the feeder to concomitantly supply an annular stream of molten glass and a gas in the interior thereof to form a hollow filament. The gas supply tubes are connected to a header or headers located above the pool of molten glass. Thus, the gas supply tubes are long and subject to various distorting forces. Various intricate systems for attaching the gas supply tubes to or at the feeder tips are disclosed, but such designs are rather complex and require a substantial amount of precious metal to be used.

The present invention provides a feeder capable of producing hollow filaments wherein the stream defining tips are adapted to move the gas from the forming zone into the interior of the forming cone to produce such filaments.

DISCLOSURE OF THE INVENTION

This invention pertains to a tip assembly for use in a bushing for the production of hollow glass filaments comprising: a first tubular member adapted to be fastened to a discharge wall of the bushing and to receive a of flow of molten glass therethrough, and a second tubular member positioned within the first tubular member, the second tubular member having a passageway in communication with the region immediately adjacent the exterior of the first tubular member to permit the gas of the region to move from that region through the passageway of the second tubular member into the interior of the stream of molten glass to produce hollow filaments.

BRIEF DESCRIPTION OF DRAWINGS

FIG. 3 is an enlarged cross-sectional view of another tip assembly according to the principles of this invention.

FIG. 4 is a bottom view of the tip assembly of FIG. 3.

FIG. 5 is an enlarged cross-sectional view of yet another tip assembly according to the principles of this invention.

FIG. 6 is an enlarged cross-sectional view of a tipless feeder having a gas delivery system according to the principles of the present invention.

FIG. 7 is a bottom view of the tipless feeder system of FIG. 6.

FIG. 8 is an enlarged cross-sectional view of a tipless feeder having another gas delivery system according to the principles of the present invention.

BEST MODE OF CARRYING OUT THE INVENTION

Figure 1:
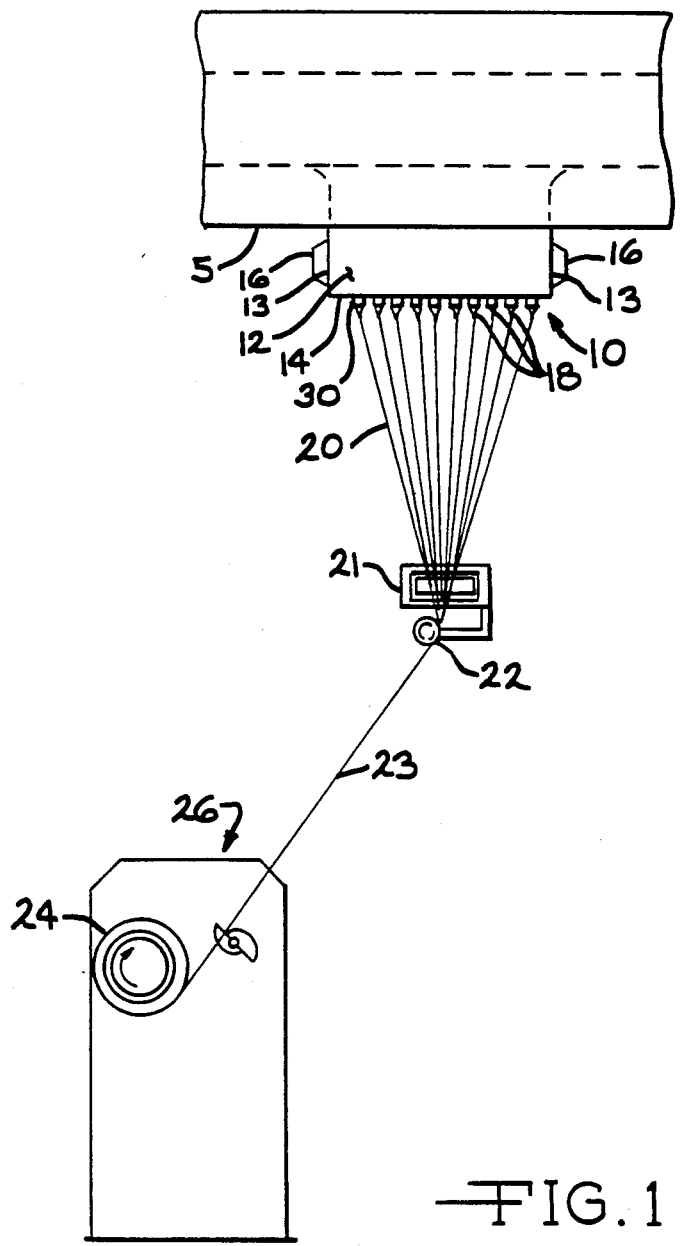
FIG. 1 is a semi-schematic front elevational view of a glass textile type fiber forming system.

As shown in FIG. 1, feeder 10, which is comprised of an orificed bottom or discharge wall 14 and other sections such as containment or sidewalls 12 and end walls 13, is adapted to provide a plurality of streams 18 of molten inorganic or mineral material, such as glass, through a plurality of tip assemblies 30. Feeder 10, which depends from and receives a flow of molten glass from forehearth 5, is electrically energized, including discharge wall 14, via terminals 16 attached to a suitable source of electrical energy (not shown) to heat the molten glass therein as is known in the art. Feeder 10, including tip assembly 30, may be fabricated from any suitable material, such as the platinum/rhodium alloys known in the art. As shown, terminals 16 are joined to end walls 13, but terminals 16 may extend outwardly from bottom wall 14 if desired.

The streams 18 of molten glass having a void therein are into continuous hollow filaments 20 through the action of winder 26, or any other suitable means. The filament forming region can be cooled by any suitable means (not shown), for example finshields or forced air convection as is known in the art.

Size applicator means 21 provides a coating or sizing material to the surface of the filaments 20 which advance to gathering shoe or means 22 to be collected as an advancing strand or bundle 23 as is known in the art. Strand 23 is then wound into package 24 upon a collect of winder 26.

Figure 2:
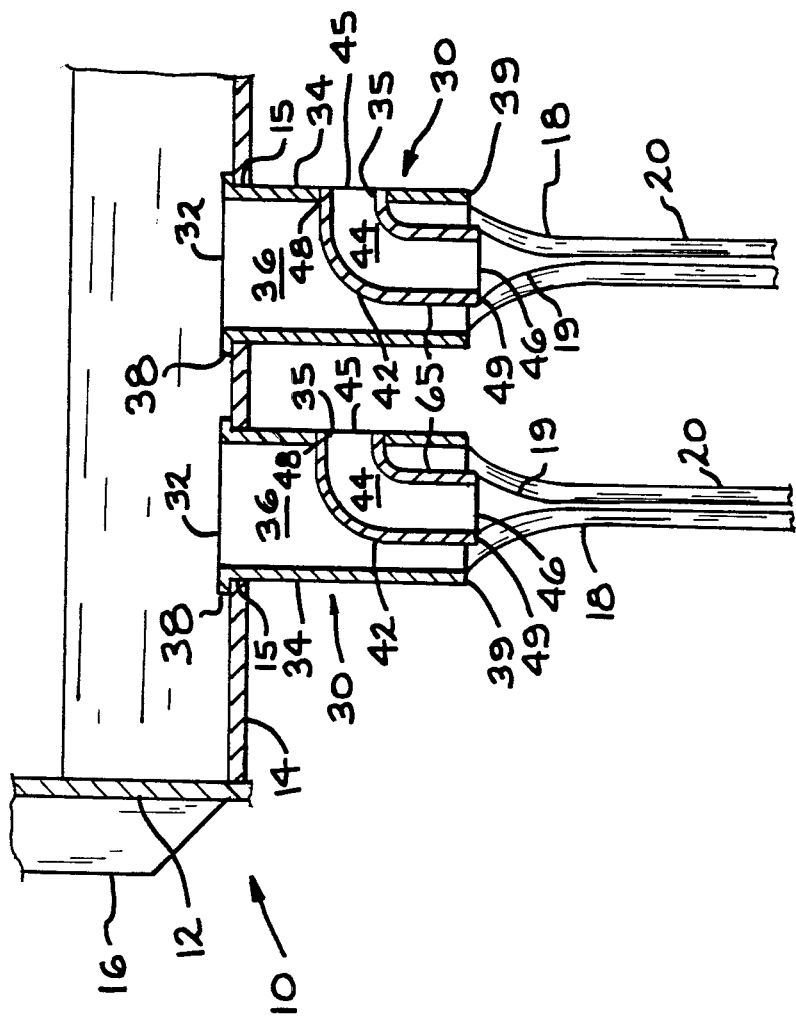
FIG. 2 is an enlarged cross-sectional view of the feeder shown in FIG. 1.

As can be more readily seen in FIG. 2, tip assemblies 30 are located in orifices 15 in discharge wall 14, similar to conventional tips. Thus, tip assemblies 30 depend from discharge wall 14, and according to the principles of this invention, the tip assemblies are adapted to move or draw the gas or ambient air immediately surrounding the tips 30 into the conical streams 18 of molten material to produce a continuous void 19 therein to produce hollow filaments 20.

In the system shown in FIG. 2, the gas is drawn into the interior of the cone 18 by the fact that the internal pressure of the molten glass at that location is sub-atmospheric due to, among other things, the attenuation of the cone 18 into a filament 20. That is, no outside source of pressurized air is needed to produce the hollow configuration. However, it is to be understood that the present invention can be adapted to be utilized in conjunction with a pressurized system as will discussed later herein.

Tip assembly 30 is comprised of first tubular member 32 and second tubular member 42, which is located within bore or passageway 36 of first member 32. In short, one end of member 42 is open to ambient air pressure immediately surrounding the tips 30, that is immediately adjacent discharge wall 14, and the other end of member 42 is located at or close to the tip exit. As the molten glass flows through the annulus formed between tubular members 32 and 42, air in the forming region or zone is aspirated through passageway 44 of second member 42 into the cone 18 being attenuated into a filament 20, thereby forming a hollow filament 20.

In particular, first tubular member 32 has a sleeve or wall segment 34 having an aperture 35 located intermediate shoulder 38 and distal end 39. First end 48 of second tubular member 42 is attached to sleeve segment 34 at aperture 35. Thus, inlet 45 of passageway 44 of second member 42 is in communication with the region immediately adjacent to exterior of first member 32. Distal end 49 of second member 42 is concentrically located within the bore 36 of first member 32, and distal end 49 of second member 42, and accordingly outlet 46 of passageway 44, is located slightly below the distal end 39 of first member 32. It is to be understood, however, that other orientations may be acceptable.

In addition to having a non-concentric alignment between bore 36 and outlet 46, bore 36 of first member 32 may be of a non-circular configuration to enable the production of non-circular filaments having a continuous void centrally or non-centrally therein, as desired.

As shown in FIG. 2, second tubular member 42 is "L" shaped (inverted) and is attached to sleeve 34 at one location. The design of tip assembly 53 shown in FIGS. 3 and 4 incorporates a "T" shaped second tubular member 65 attached within first tubular member 55 at a plurality of locations.

Sleeve or wall 56 of first member 55 contains opposed apertures 57 and 58 which are adapted to receive ends 68 and 69 of beam 67 of second member 65. Apertures 57 and 58 are located intermediate first end 61 and distal end 62 of sleeve 56. Projection 71 of second member 65 extends from beam 67 substantially concentrically, downwardly through bore 59 of first member 55. Distal end 72 of projection 71 is located at distal end 62 of first member 55. Thus, the gas of the region immediately below the discharge wall and surrounding first member 55 will be drawn into inlets 75 and 76 of passageway 74 of second member 65 and exhausted at outlet 77 thereof at distal end 72 according to the principles of this invention.

Tip assembly 80, as shown in FIG. 5, is comprised of second tubular member 87 located within the bore 83 of first tubular member 82 with the distal end 92 of second member 87 being located, similar to the previous designs, at distal end 85 of first member 82. However, second tubular member 87 and thus passageway 89 thereof does not penetrate the wall or sleeve of first member 82. Rather, second member is "J" shaped (inverted) such that second member extends upwardly over first end or shoulder 84 of first member 82 and then arcuately downward a distance sufficient such that inlet end 9 of second member 87 is located at or below the exterior surface of discharge wall 14. Thus, second member is suitably attached to discharge wall 14, and the gas of the region immediately below discharge wall is moved into the conical stream of molten glass to form a hollow filament.

FIGS. 6 and 7 set-forth a hollow fiber forming system for "tipless" feeders, that is feeders having no stream defining tips depending therefrom. As such, discharge wall 101 contains a plurality of stream defining orifices 102 (only one orifice shown for convenience) through which the molten glass exits for attenuation into filaments. Conduit 104 is attached to discharge wall 101 and is oriented such that first or inlet end 105 is in communication with the gas in the forming zone and second or outlet end 106 is positioned in the conical stream of molten glass 109 to permit the gas of the forming zone to be aspirated through passageway 108 into stream 109 to produce hollow fibers or filaments.

Conduit 104 is "U" shaped (inverted) and oriented such that outlet end 106, as well as inlet end, are oriented substantially parallel to discharge wall 101 or perpendicular to the axis of orifice 102 and stream 109.

FIG. 8 depicts another "tipless" design wherein a substantially straight conduit 114 extends partially into the cone of molten glass. As shown inlet end 115 of conduit 114 is attached to the exterior of discharge wall 111 adjacent stream defining orifice 112. Outlet end 116 is positioned centrally below orifice 112 and is beveled to reduce the tendency of molten glass to fill passageway 118 of conduit 114 which permits the ambient air of the forming zone to be aspirated into the molten stream to form hollow filaments.

Figure 9:
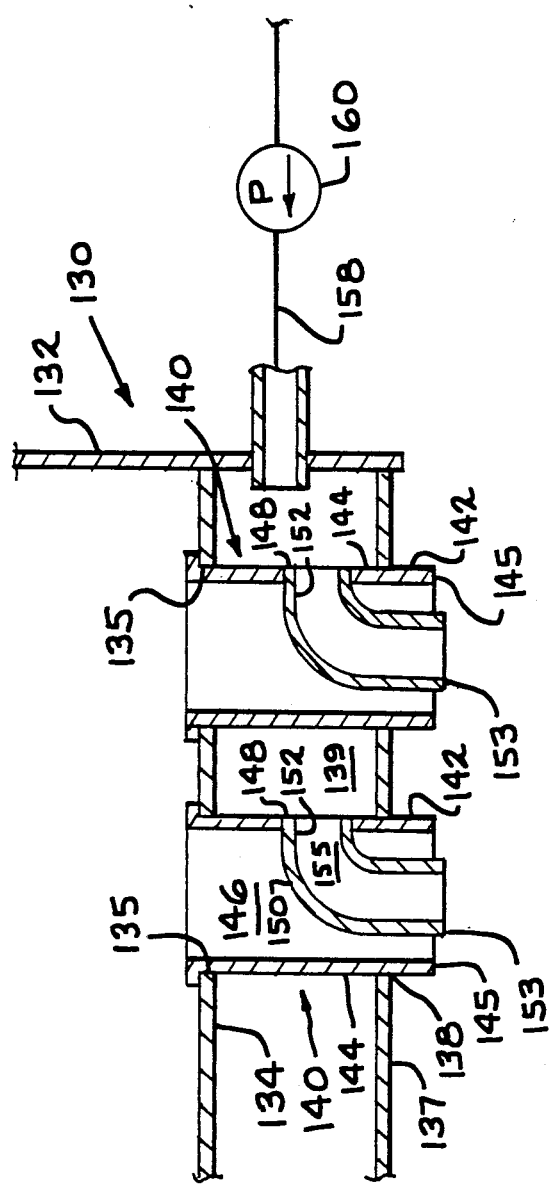
FIG. 9 is an enlarged cross-sectional view of a feeder/tip system of the present invention adapted to supply the gas to the interior of the forming cone at a predetermined, controlled pressure.

FIG. 9 depicts a hollow fiber forming system wherein gas, such as air, at predetermined elevated and controlled pressure is injected into the molten streams from a region immediately below the discharge wall to form such filaments.

Feeder 130 is comprised, similar to FIG. 2, containment walls 132 and discharge wall 134 which has a plurality of tip assemblies 140 positioned in orifices 135 in wall 134. A plate 137, spaced from discharge wall 134 and joined to containment walls 132 forms a chamber 139 which is connected to a source of pressurized gas via piping 158 and pressure regulator means 160.

First tubular member 142 is joined to and extends from discharge wall 134 through apertures 138 in plate 137. As shown, distal end 145 of first member 142 extends below or beyond plate 137, although end 145 may be flush with the exterior of plate 137, if desired.

Second tubular member 150 is positioned within bore 146 of first member 142 and inlet end 152 thereof is attached to wall 144 of aperture 148 of first member 142. Distal end 153 of second member 150 is positioned below distal end 145 to direct the gas into the filament forming cone of molten glass. Thus, passageway 155 of second member provides a pathway for the gas in chamber 139 to enter the forming cone of molten glass to form hollow filaments according to the principles of the present invention.

It is to be understood that the feeder/tip assemblies of the present invention can be utilized to form discontinuous as well as the continuous filaments if desired.

It is apparent that within the scope of the invention, modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber forming industry.

I claim:

1. A tip assembly for use in a feeder for the production of hollow glass filaments comprising:
    a first tubular member fastened to a discharge wall of the feeder and adapted to receive a flow of molten glass therethrough, and
    a second tubular member positioned within the first tubular member, the second tubular member having a passageway in communication with the region immediately adjacent the exterior of the first tubular member, outwardly of said discharge wall, to permit the gas of the region to move from that region through the passageway of the second tubular member into the flow of molten glass to produce a hollow filament.

2. The tip assembly of claim 1 wherein the second tubular member is attached to the first tubular member and the passageway of the second tubular member extends through a sleeve segment of the first tubular member and includes a portion whose axis is parallel to said discharge wall.

3. The tip assembly of claim 2 wherein the second tubular member is "L" shaped.

4. The tip assembly of claim 2 wherein the second tubular member is attached to the sleeve segment of the first tubular member and said passageway includes a portion whose axis is perpendicular to the wall.

5. The tip assembly of claim 2 wherein the second tubular member is attached to the sleeve segment at a plurality of locations and the passageway of the second tubular member extends through the sleeve segment at those locations.

6. The tip assembly of claim 5 wherein the second tubular member is "T" shaped.

7. The tip assembly of claim 2 wherein the distal end of the second tubular member is positioned at or below the distal end of the first tubular member.

8. A bushing for the production of hollow filaments from heat softened inorganic material comprising:
a discharge wall having a plurality of orifices;
a plurality of first tubular members attached at the orifices of the discharge wall adapted to receive a flow of molten material therethrough, such first tubular members having a sleeve segment extending outwardly from the discharge wall adapted to define the flow of molten material into streams; and
second tubular members positioned within the first tubular members, such second tubular members having a passageway in communication with the region immediately adjacent the exterior of the first tubular member and the discharge wall to permit the gas occupying that region to continuously move from that region through the passageway to the interior of the stream of molten material flowing from the first tubular member to produce hollow filaments.

9. The bushing of claim 8 wherein the second tubular member is attached to the first tubular member and the passageway of the second tubular member extends through the sleeve segment of the first tubular member, said passageway including a portion whose axis is parallel to said discharge wall.

10. The bushing of claim 8 wherein the second tubular member is attached to the discharge wall and the passageway of the second tubular member extends through the discharge wall.

11. The bushing of claim 8 further comprising a plate spaced outwardly from the discharge wall and located intermediate the discharge wall and the distal ends of the first tubular members, the plate and discharge wall, in part, defining a chamber adapted to be supplied with a gas at a predetermined pressure, the passageways of the second tubular members being in communication the chamber.

12. The bushing of claim 8 wherein such second tubular members are "L" shaped.

13. The bushing of claim 10 wherein the second tubular member is attached to the sleeve segment of the first tubular member.

14. The bushing of claim 11 wherein the second tubular member is attached to the sleeve segment at a plurality of locations and the passageway of the second tubular member extends through the sleeve segment at those locations.

15. A bushing for the production of hollow continuous filaments from molten mineral material comprising:
a discharge wall having a plurality of orifices therethrough adapted to define the molten material into streams for attenuation into filaments; and
a plurality of conduits positioned immediately outwardly adjacent the discharge wall, such conduits having a passageway extending from within the interior of the stream of molten material to the ambient region around the streams immediately outwardly adjacent the discharge wall to permit the gas occupying that region to move continuously from that region through the passageway into the interior of the stream of molten material to produce hollow, continuous filaments therefrom.

16. The bushing of claim 15 wherein each stream is associated with at least one conduit said conduit having a passageway with a portion whose longitudinal axis is parallel to said discharge wall.

17. The bushing of claim 15 wherein the exit aperture of the passageway is oriented substantially perpendicular to the axis of the associated orifice.

18. The bushing of claim 17 wherein in the entrance of the passageway is oriented substantially parallel to the discharge wall.

19. The method of producing a hollow inorganic filament comprising:
supplying a stream of molten inorganic material through the bottom wall of a feeder; moving gas from immediately downwardly of the wall and adjacent the exterior of the stream into the interior of the stream to form a void therein; and attenuating the void containing stream into a filament.

20. The method of claim 19 wherein the gas is drawn into the interior of the stream through a passageway extending from an aperture in said wall.

21. The method of producing a hollow filament from a stream of molten glass comprising:
moving molten glass through a stream defining member, the member having a wall;
moving the gas exteriorly surrounding the stream defining member through the wall of the member into the interior of the stream to continuously form a void therein; and
attenuating the void containing stream into a filament.

22. The method of claim 21 further comprising controlling the pressure of the gas in the region surrounding the member.

23. The method of claim 18 wherein said filament is unclad.

* * * * *